US012675609B2

(12) United States Patent
Choi

(10) Patent No.: US 12,675,609 B2
(45) Date of Patent: Jul. 7, 2026

(54) ENERGY STORAGE SYSTEM AND OPERATING METHOD THEREOF

(71) Applicant: LG ENERGY SOLUTION, LTD., Seoul (KR)

(72) Inventor: Young Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 133 days.

(21) Appl. No.: 18/580,534

(22) PCT Filed: Nov. 22, 2022

(86) PCT No.: PCT/KR2022/018493
§ 371 (c)(1),
(2) Date: Jan. 18, 2024

(87) PCT Pub. No.: WO2023/113277
PCT Pub. Date: Jun. 22, 2023

(65) Prior Publication Data
US 2024/0320375 A1 Sep. 26, 2024

(30) Foreign Application Priority Data
Dec. 14, 2021 (KR) ........................ 10-2021-0179153

(51) Int. Cl.
*G06F 21/64* (2013.01)
*G06F 11/10* (2006.01)
*G06F 21/60* (2013.01)
(52) U.S. Cl.
CPC .......... *G06F 21/64* (2013.01); *G06F 11/1004* (2013.01); *G06F 21/602* (2013.01)

(58) Field of Classification Search
None
See application file for complete search history.

(56) References Cited

U.S. PATENT DOCUMENTS

| | | | | |
|---|---|---|---|---|
| 5,734,819 A | * | 3/1998 | Lewis | ..................... G06F 21/73 726/29 |
| 10,089,499 B2 | | 10/2018 | Brochhaus | |

(Continued)

FOREIGN PATENT DOCUMENTS

| | | |
|---|---|---|
| CN | 109326835 A | 2/2019 |
| JP | 2013-218909 A | 10/2013 |

(Continued)

OTHER PUBLICATIONS

International Search Report for PCT/KR2022/018493 mailed on Feb. 8, 2023.

(Continued)

*Primary Examiner* — Syed A Roni
(74) *Attorney, Agent, or Firm* — Birch, Stewart, Kolasch & Birch, LLP

(57) ABSTRACT
In an energy storage system (ESS) including a battery management system (BMS) and a recording device, the BMS obtains operational data of the ESS and generates a first encryption code to guarantee integrity of the operational data to be transmitted to the recording device, and the recording device generates a second encryption code based on the operational data to which the first encryption code is added, to guarantee continuity of operational data received every period, and generates a third encryption code based on the second encryption code added to the operational data in a period immediately before branching to prevent a series of operational data from being falsified after branching.

13 Claims, 9 Drawing Sheets

(56)        References Cited

U.S. PATENT DOCUMENTS

| | | | |
|---|---|---|---|
| 2014/0064479 A1 | 3/2014 | Manikandan et al. | |
| 2014/0084708 A1 | 3/2014 | Yun | |
| 2016/0041002 A1 | 2/2016 | Alzate Perez et al. | |
| 2017/0237715 A1 | 8/2017 | Kärkkäinen | |
| 2019/0033377 A1 | 1/2019 | Karner et al. | |
| 2019/0033381 A1 | 1/2019 | Karner et al. | |
| 2019/0033382 A1 | 1/2019 | Karner et al. | |
| 2019/0033383 A1 | 1/2019 | Karner et al. | |
| 2019/0033384 A1 | 1/2019 | Karner et al. | |
| 2019/0033385 A1* | 1/2019 | Karner | H02J 7/00309 |
| 2019/0033396 A1 | 1/2019 | Karner et al. | |
| 2019/0033397 A1 | 1/2019 | Karner et al. | |
| 2019/0035237 A1 | 1/2019 | Karner et al. | |
| 2019/0036174 A1* | 1/2019 | Katrak | G01R 31/3835 |
| 2019/0036178 A1 | 1/2019 | Karner et al. | |
| 2019/0156069 A1 | 5/2019 | Heo et al. | |
| 2021/0242508 A1 | 8/2021 | Millen et al. | |
| 2021/0376396 A1 | 12/2021 | Burns et al. | |
| 2022/0247841 A1 | 8/2022 | Yang et al. | |
| 2022/0404426 A1 | 12/2022 | Karner et al. | |
| 2023/0188983 A1 | 6/2023 | Rigelsford et al. | |

FOREIGN PATENT DOCUMENTS

| | | | |
|---|---|---|---|
| KR | 10-1261156 | B1 | 5/2013 |
| KR | 10-2013-0075376 | A | 7/2013 |
| KR | 10-2014-0032307 | A | 3/2014 |
| KR | 10-2014-0056170 | A | 5/2014 |
| KR | 10-1413906 | B1 | 6/2014 |
| KR | 10-2017-0036100 | A | 3/2017 |
| KR | 10-2019-0059528 | A | 5/2019 |
| KR | 10-2078347 | B1 | 2/2020 |
| KR | 10-2020-0049770 | A | 5/2020 |
| KR | 10-2020-0136733 | A | 12/2020 |
| KR | 10-2021-0001157 | A | 1/2021 |
| KR | 10-2021-0051462 | A | 5/2021 |
| KR | 10-2277434 | B1 | 7/2021 |
| KR | 10-2304395 | B1 | 9/2021 |
| WO | WO 2021/222662 | A1 | 11/2021 |

OTHER PUBLICATIONS

Extended European Search Report for European Application No. 22907747.4, dated Sep. 25, 2024.

* cited by examiner

110

120

START

OBTAIN OPERATIONAL DATA OF ENERGY STORAGE SYSTEM IN
BATTERY MANAGEMENT SYSTEM INCLUDED IN ENERGY STORAGE SYSTEM    ~S410

GENERATE FIRST ENCRYPTION CODE TO GUARANTEE INTEGRITY OF
OPERATIONAL DATA TO BE TRANSMITTED TO RECORDING DEVICE    ~S420

ADD FIRST ENCRYPTION CODE TO OPERATIONAL DATA AND
TRANSMIT OPERATIONAL DATA    ~S430

END

| Time | V | I | T | SOC | ETC1 | TEC2 | TEC3 | ... | Code A | Code B |
|------|---|---|---|-----|------|------|------|-----|--------|--------|
| | | | | | | | | | CA1 | CB1 |
| | | | | | | | | | CA2 | CB2 |
| | | | | | | | | | CA3 | CB3 |

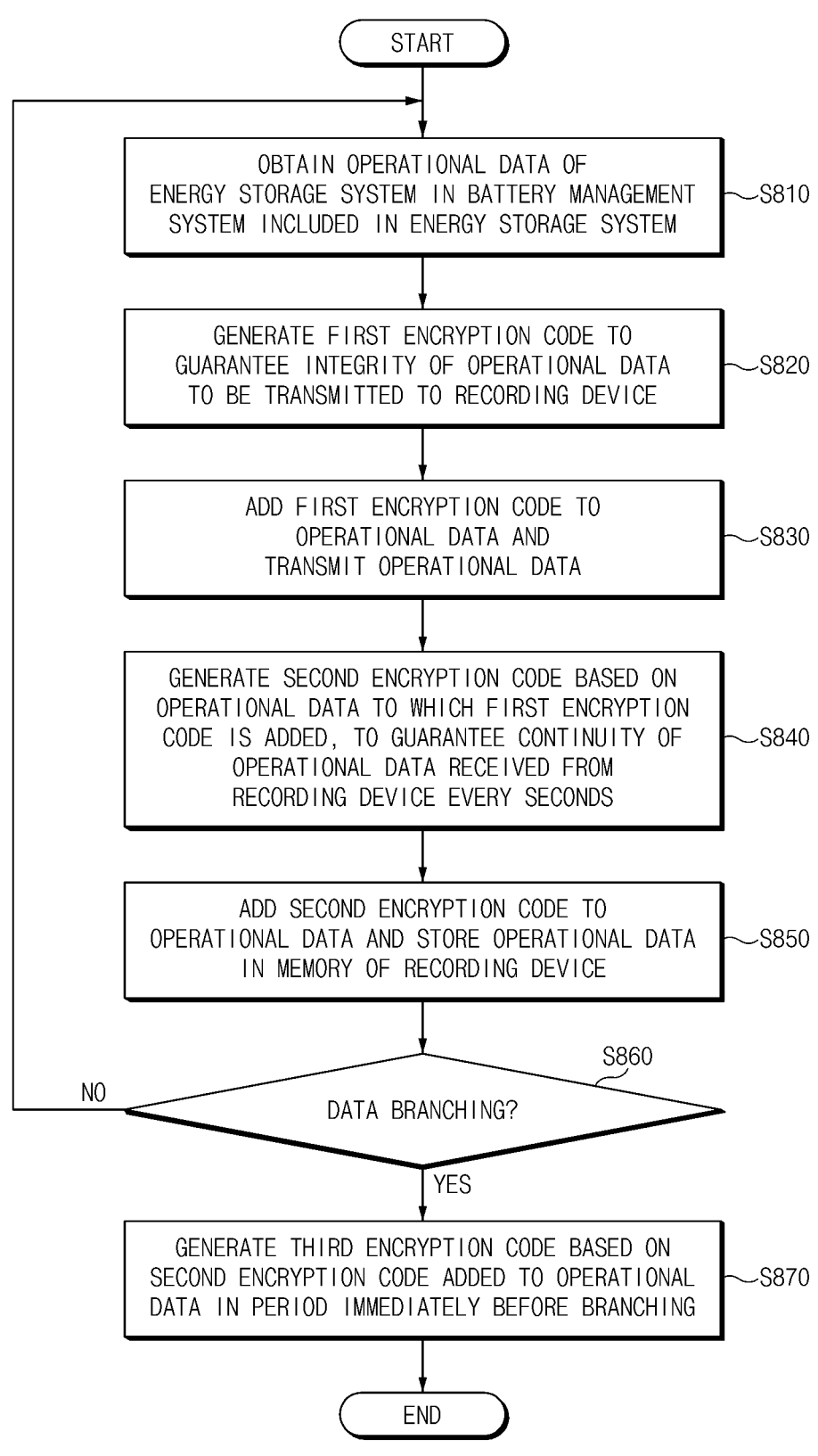

START

OBTAIN OPERATIONAL DATA OF
ENERGY STORAGE SYSTEM IN BATTERY MANAGEMENT
SYSTEM INCLUDED IN ENERGY STORAGE SYSTEM    S810

GENERATE FIRST ENCRYPTION CODE TO
GUARANTEE INTEGRITY OF OPERATIONAL DATA
TO BE TRANSMITTED TO RECORDING DEVICE    S820

ADD FIRST ENCRYPTION CODE TO
OPERATIONAL DATA AND
TRANSMIT OPERATIONAL DATA    S830

GENERATE SECOND ENCRYPTION CODE BASED ON
OPERATIONAL DATA TO WHICH FIRST ENCRYPTION
CODE IS ADDED, TO GUARANTEE CONTINUITY OF
OPERATIONAL DATA RECEIVED FROM
RECORDING DEVICE EVERY SECONDS    S840

ADD SECOND ENCRYPTION CODE TO
OPERATIONAL DATA AND STORE OPERATIONAL DATA
IN MEMORY OF RECORDING DEVICE    S850

S860

NO    DATA BRANCHING?

YES

GENERATE THIRD ENCRYPTION CODE BASED ON
SECOND ENCRYPTION CODE ADDED TO OPERATIONAL
DATA IN PERIOD IMMEDIATELY BEFORE BRANCHING    S870

END

FIG.8

ENERGY STORAGE SYSTEM AND OPERATING METHOD THEREOF

CROSS-REFERENCE TO RELATED APPLICATION

This application claims priority to and the benefit of Korean Patent Application No. 10-2021-0179153 filed in the Korean Intellectual Property Office on Dec. 14, 2021, the entire contents of which are incorporated herein by reference.

TECHNICAL FIELD

Embodiments disclosed herein relate to an energy storage system and an operating method thereof.

BACKGROUND ART

An energy storage system (ESS) is a system that stores electrical energy and manages the same for use when needed, and in general, an energy storage system installed in a power plant driving a large-scale energy grid or a building with high energy consumption includes hundreds to thousands of batteries. A battery management system (BMS) included in the ESS frequently monitors the state of each battery (e.g., voltage, current, temperature, state of charge, etc., of a battery cell), and optionally charges/discharges the battery for an efficient operation of the entire system or controls connection with other devices.

Operational data required for the operation of the ESS includes additional information, such as battery state information (current, voltage, temperature, state of charge (SoC), etc., of the battery cell) collected by sensors, network information for communication between devices, BMS setting values, etc., and is stored in a logging device by the BMS and a controller controlling the same. Such operational data is key information that is the basis of quality assurance services for customers and data integrity has to be maintained, and in a conventional ESS, it is easy for a third party to arbitrarily falsify the data due to an insufficient protection level of the operational data. In addition, most ESSs operate independently, such that real-time collection of data and storage of the data in servers are limited, making it difficult to protect the data, and when the entire data is encrypted and stored to prevent falsification, excessively much computing resources are consumed.

DISCLOSURE

Technical Problem

Embodiments disclosed herein aim to provide an operating method by encrypting and storing data in an efficient manner to prevent falsification of operational data of an energy storage system.

Embodiments disclosed herein also aim to provide an energy storage system operating according to the above-described operating method.

Technical problems of the embodiments disclosed herein are not limited to the above-described technical problems, and other unmentioned technical problems would be clearly understood by one of ordinary skill in the art from the following description.

Technical Solution

A battery management system (BMS) according to an embodiment includes a BMS controller configured to obtain operational data of an energy storage system (ESS) including necessary data related to a state of a battery and additional data, to obtain sampling data by randomly sampling the additional data, and generate a first encryption code based on the necessary data and the sampling data and a communication unit configured to transmit the operational data to which the first encryption code is added, to a recording device.

According to an embodiment, the first encryption code may include first data indicating an index of the sampling data and second data generated by encrypting the necessary data and the sampling data.

An energy storage system (ESS) according to an embodiment includes a battery management system (BMS) controller configured to obtain operational data of the ESS including necessary data related to a state of a battery and additional data, obtain sampling data by randomly sampling the additional data, and generate a first encryption code based on the necessary data and the sampling data and a communication unit configured to transmit the operational data to which the first encryption code is added to a recording device and the recording device configured to receive the operational data to which the first encryption code is added, from the BMS.

According to an embodiment, the recording device may be further configured to generate a second encryption code based on the operational data to which the first encryption code is added, and add the second encryption code to the operational data and store the operational data.

According to an embodiment, the second encryption code may be generated based on a first encryption code of operational data received in a current period and a second encryption code of operational data received in a previous period.

According to an embodiment, the recording device may be further configured to generate a third encryption code based on the second encryption code added to the operational data in a period immediately before branching, in response to the operational data stored in the recording device being branched.

According to an embodiment, the third encryption code may be generated based on the second encryption code added to the operational data in the period immediately before branching, an identification number of the recording device, and information of a time in which the operational data begins to be stored in the recording device.

According to an embodiment, the second data, the second encryption code, and the third encryption code may be generated using a cyclic redundancy check (CRC) encryption method.

According to an embodiment, the necessary data may include at least one of current time information, a voltage of the battery, a current of the battery, a temperature of the battery, and a state of charge (SoC) of the battery, and the additional data may include at least one of network configuration information, Internet protocol (IP) information, and a setting value of the battery management system.

An operating method of an energy storage system (ESS) includes obtaining operational data of the ESS including necessary data related to a state of a battery and additional data, obtaining sampling data by randomly sampling the additional data and generating a first encryption code based on the necessary data and the sampling data, and adding the first encryption code to the operational data and transmitting the operational data to a recording device.

According to an embodiment, the operating method may further include generating a second encryption code based on the operational data to which the first encryption code is added, and adding the second encryption code to the operational data and storing the operational data.

According to an embodiment, the operating method may further include generating a third encryption code based on the second encryption code added to the operational data in a period immediately before branching, in response to the operational data stored in the recording device being branched.

Advantageous Effects

According to the foregoing embodiment, it is possible to prevent data from being arbitrarily falsified by a third party by encrypting operational data of an energy storage system. More specifically, by adding an encryption code generated using the operational data to the data, it is possible to prevent a manipulative act of intercepting operational data received from a recording device for each period, cheating a pattern by mixing the order of data for each period, or cheating a usage pattern by using the entire data branched from another recording device.

Moreover, various effects recognized directly or indirectly from the disclosure may be provided.

DESCRIPTION OF DRAWINGS

In order to more clearly describe technical solutions of embodiments disclosed herein or the prior art, the drawings required in the description of the embodiments are briefly introduced below. It should be understood that the following drawings are for the purpose of explaining the embodiments of the present specification and not for limiting purposes. In addition, representations of some components in the drawings may be exaggerated or omitted for clarity of explanation.

FIG. 7 shows operational data to which a second encryption code is added, according to an embodiment.

FIG. 8 is a flowchart showing am operating method of an ESS according to another embodiment.

MODE FOR INVENTION

Figure 1:
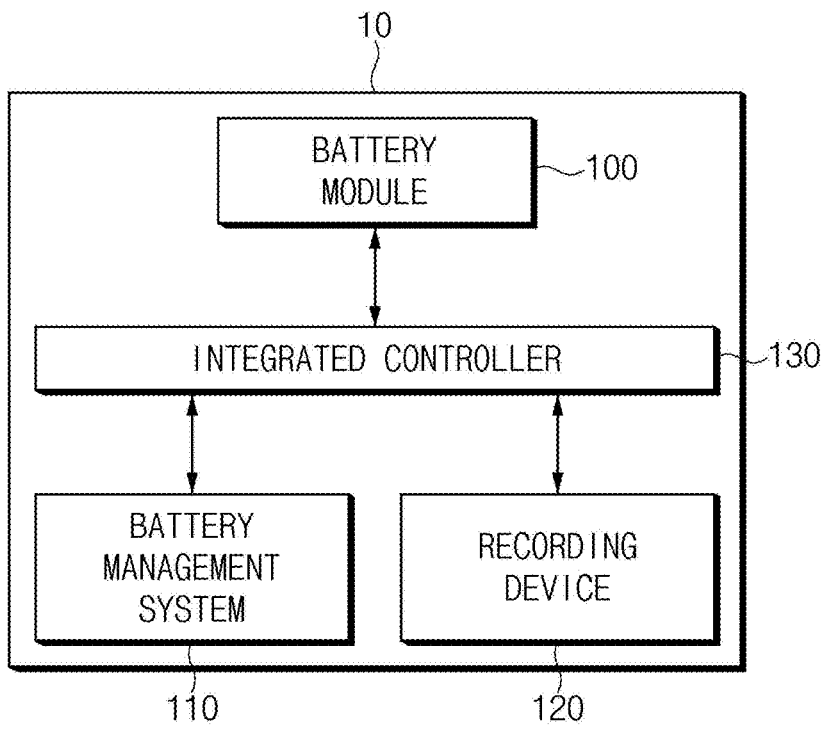
FIG. 1 is a block diagram showing a configuration of an energy storage system (ESS) according to an embodiment.

Hereinafter, embodiments disclosed in this document will be described in detail with reference to the exemplary drawings. In adding reference numerals to components of each drawing, it should be noted that the same components are given the same reference numerals even though they are indicated in different drawings. In addition, in describing the embodiments disclosed in this document, when it is determined that a detailed description of a related known configuration or function interferes with the understanding of an embodiment disclosed in this document, the detailed description thereof will be omitted.

Although terms used herein are selected with general terms popularly used at present under the consideration of functions in the disclosure, the terms may vary according to the intention of those of ordinary skill in the art, custom, or introduction of new technology. In addition, in a specific case, the applicant voluntarily may select terms, and in this case, the meaning of the terms may be disclosed in a corresponding description part of the present specification. Therefore, the terms used herein should be defined not by the simple names of the terms but by the substantial meaning of the terms and the contents throughout the disclosure.

Terms defined in the present disclosure are used for only describing a specific exemplary embodiment and may not have an intention to limit the scope of other exemplary embodiments. It is to be understood that the singular forms include plural references unless the context clearly dictates otherwise.

Configuration of Energy Storage System

FIG. 1 is a block diagram showing a configuration of an energy storage system (ESS) according to an embodiment. Referring to FIG. 1, an ESS 10 according to an embodiment may include a battery module 100, a battery management system 110, and a recording device 120.

The battery module 100 may include at least one battery cell, and may be an assembly that bundles a certain number of battery cells and puts them in a frame to protect them from external shock, heat, vibration, etc., and to manage information. The battery cell is a basic unit of a battery to use electric energy by charging and discharging the electric energy, and is manufactured by putting components such as a cathode, an anode, a separator, an electrolyte, etc., into a pouch or a cylindrical or rectangular case. According to an embodiment, the battery cell may be a lithium ion (Li-ion) battery, an Li-ion polymer battery, a nickel-cadmium (Ni—Cd) battery, a nickel hydrogen (Ni-MH) battery, etc., and is not limited thereto.

The battery management system 110 may collect information about a battery cell included in the battery module 100, e.g., voltage, current, temperature, resistance, a state of charge (SoC), a state of health (SoH), etc., of each battery cell to control and manage the battery module 100. For an efficient operation of the battery, the battery cell may be selectively charged or discharged or connection with another battery cell may be controlled. The battery management system 110 may obtain necessary data (e.g., data related to a state of the battery, such as current, voltage, temperature, etc.) collected from the battery module 100 and other additional data (e.g., additional data required for operating a system such as network information, a BMS setting value, etc.) every periods and transmit the same to the recording device 120.

Figure 2:
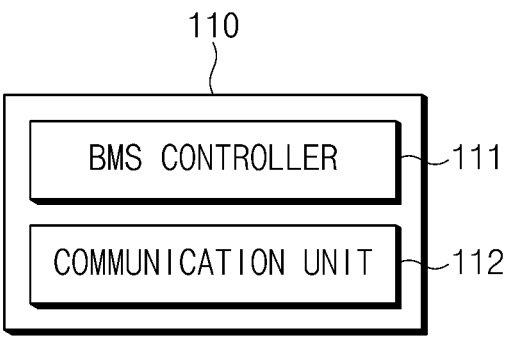
FIG. 2 is a block diagram showing a configuration of a battery management system according to an embodiment.

FIG. 2 is a block diagram showing a configuration of a battery management system according to an embodiment. Referring to FIG. 2, the battery management system 110 may include a BMS controller 111 and a communication unit 112.

The BMS controller 111 may obtain operational data of the ESS including the necessary data related to the state of the battery and the additional data, obtain sampling data by sampling the additional data at random, and generate a first encryption code based on the necessary data and the sampling data.

The communication unit 112 may transmit the operational data to which the first encryption code is added to the recording device 120.

While the single battery module 100 is shown in FIG. 1, the ESS 10 according to an embodiment may use a plurality of battery modules without being limited to a single battery module. In this case, the battery management system 110 may include a plurality of slave battery management systems (e.g., a module battery management system) that controls each battery module and a master battery management system (e.g., a rack battery management system, a bank battery management system, etc.) that receives information from the slave battery management system and transmit the same to another device or integrally controls the slave battery management system.

According to an embodiment, the ESS 10 may further include an integrated controller for controlling an operation of the battery management system 110 and/or the recording device 120 according to manipulation of a user or a pre-programmed algorithm. According to an embodiment, the integrated controller may control an operation of the battery management system 110 according to a setting value (e.g., a period in which operational data is recorded, a network configuration, etc.) input through a user interface. The integrated controller may be a battery system controller (BSC) generally used in a battery control system.

The recording device 120 may receive and store the operational data (the necessary data related to the state of the battery and the other additional data) of the ESS 10 from the battery management system 110.

Figure 3:
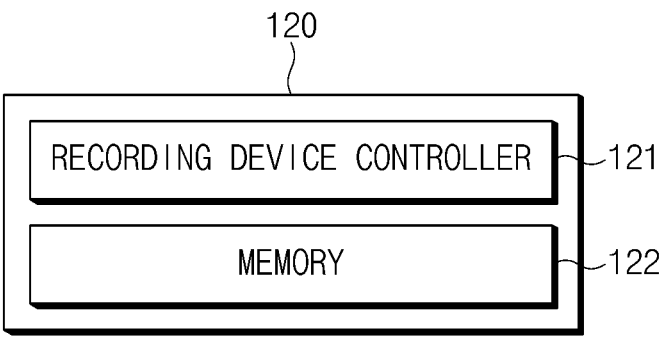
FIG. 3 is a block diagram showing a configuration of a recording device according to an embodiment.

FIG. 3 is a block diagram showing a configuration of a recording device according to an embodiment. Referring to FIG. 3, the recording device 120 may include a recording device controller 121 and a memory 122.

The recording device controller 121 may be configured to read the operational data stored in the memory 122 in response to a call from an external device (e.g., a user terminal, the battery management system 110, etc.), process the operational data in response to a command, or transmit the operational data to an external device or display the operational data. To guarantee continuity of the operational data received from the battery management system 110, a second encryption code may be generated based on the first encryption code.

The memory 122 may store the operational data in which the second encryption code is generated. The memory 122 may be various storage media such as a semiconductor memory like a RAM, a ROM, a flash memory, etc., a magnetic disk, an optical disk, etc., and may be located outside in spite of being shown as being located inside the recording device 120.

The above-described configuration of the ESS is merely an example, and components required for executing the operating method described below may be further added or components that are not necessary may be excluded. Although each component is shown as a single unit in FIG. 1, two or more units may be combined to operate as a single component or may operate in parallel, without being limited thereto.

Operating Method of Energy Storage System

Hereinbelow, a description will be made of embodiments of an operating method to encrypt and store operational data by using the components of the above-described ESS. FIGS. 1 to 3 are referred to for the components of the ESS, and thus the reference numerals used in FIGS. 1 to 3 will be used together.

Figure 4:
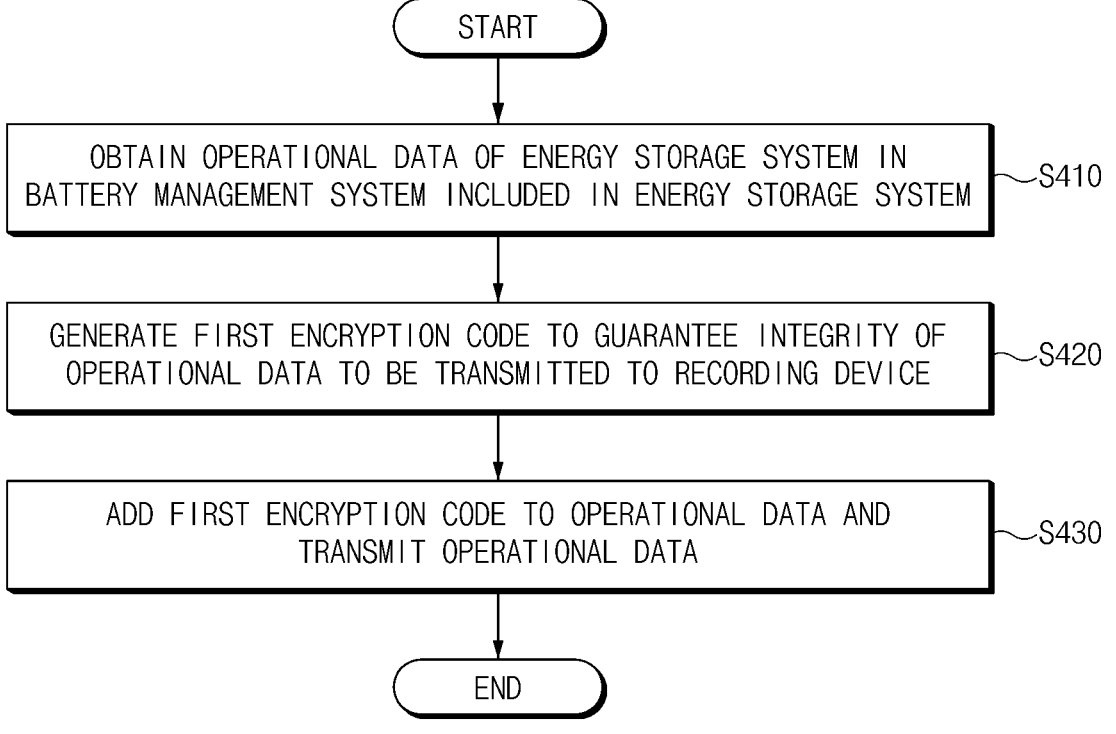
FIG. 4 is a flowchart showing am operating method of an ESS according to an embodiment.

FIG. 4 is a flowchart showing am operating method of an ESS according to an embodiment.

First, the battery management system 110 included in the ESS 10 performs operation S410 of obtaining operational data of the ESS 10. The operational data may include necessary data related to a state of a battery and other additional data. For example, the necessary data may include one or more data directly related to the state of the battery, such as current time information and a voltage V, a current I, a temperature T, and a state of charge (SoC) of each battery cell at the current time. The additional data may include one or more data that is not directly related to the state of the battery, such as network configuration information, internet protocol (IP) information, a BMS setting value, etc. Herein, the necessary data and the additional data are terms used simply for distinguishment, and data that is not listed in the foregoing example may be further included or excluded.

The battery management system 110 may obtain the necessary data through a sensor installed in the battery cell. Moreover, the additional data may be obtained from information input through the user interface or previously stored in the memory. The battery management system 110 may obtain the operational data every periods (e.g., every seconds), and the period for obtaining the data may be set at random.

Next, the battery management system 110 may perform operation S420 of generating a first encryption code (also called a "Check Byte") to guarantee the integrity of the operational data to be transmitted to the recording device 120. The first encryption code may be generated based on the necessary data and the additional data.

Next, operation S430 of adding the first encryption code to the operational data to transmit the operational data to the recording device 120 may be performed. Operation S430 may be performed through the communication unit 112 of the battery management system 110.

Figure 5:
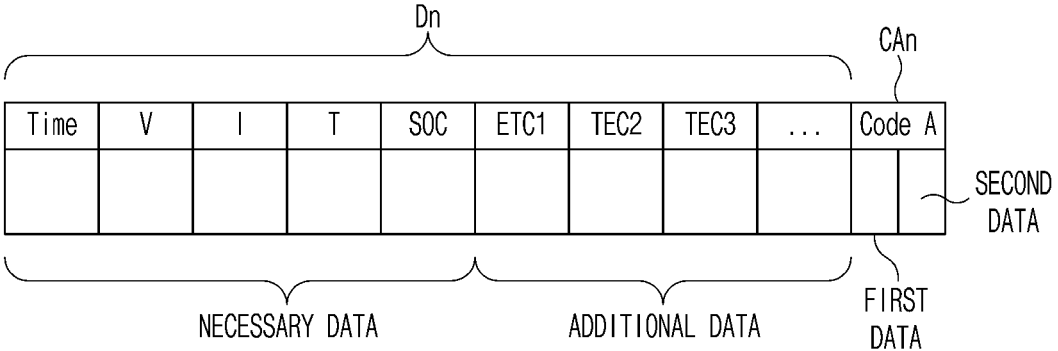
FIG. 5 shows operational data to which a first encryption code is added, according to an embodiment.

FIG. 5 shows a structure of operational data to which the first encryption code generated in operation S420. Referring to FIG. 5, operational data Dn in a period n may include necessary data (a time Time, a battery voltage V, a current I, a temperature T, an SoC) and additional data (network configuration information ETC1, IP information ETC2, a BMS setting value ETC3, . . . ), and a first encryption code CAn for guaranteeing complete transmission of the operational data Dn may be added thereto.

According to an embodiment, the first encryption code CAn may include first data (having a 2-byte size) indicating an index of the sampling data obtained by sampling the additional data at random and second data (having a 2-byte size) generated by encrypting the necessary data and the sampling data in a designated manner.

According to an embodiment, the second data may be generated by a CRC 16 or CRC 32 encryption method. Cyclic redundancy check (CRC) is one of methods for determining a check value to determine whether there is an error in data transmitted in transmission of the data over a network. A CRC value may be calculated according to a given value of the data before transmission of the data and added to the data, and then the data may be transmitted, and a CRC value may be calculated again using a value of data received after end of transmission of the data, and the two values may be compared to detect an error. CRC 16 applies a 16-bit polynomial expression to a data block, and CRC 32 applies a 32-bit polynomial expression to a data block. A manager may adopt a CRC 32 encryption scheme for more accurate error detection.

Operations S410 to S430 may be performed repeatedly every periods. The recording device 120 may calculate again a CRC value with the first encryption code CAn to determine whether the operational data is not falsified during transmission. When the CRC values are not matched (that is, falsification of the operational data is expected), the manager may be informed of so without storing the operational data in the memory 122.

Figure 6:
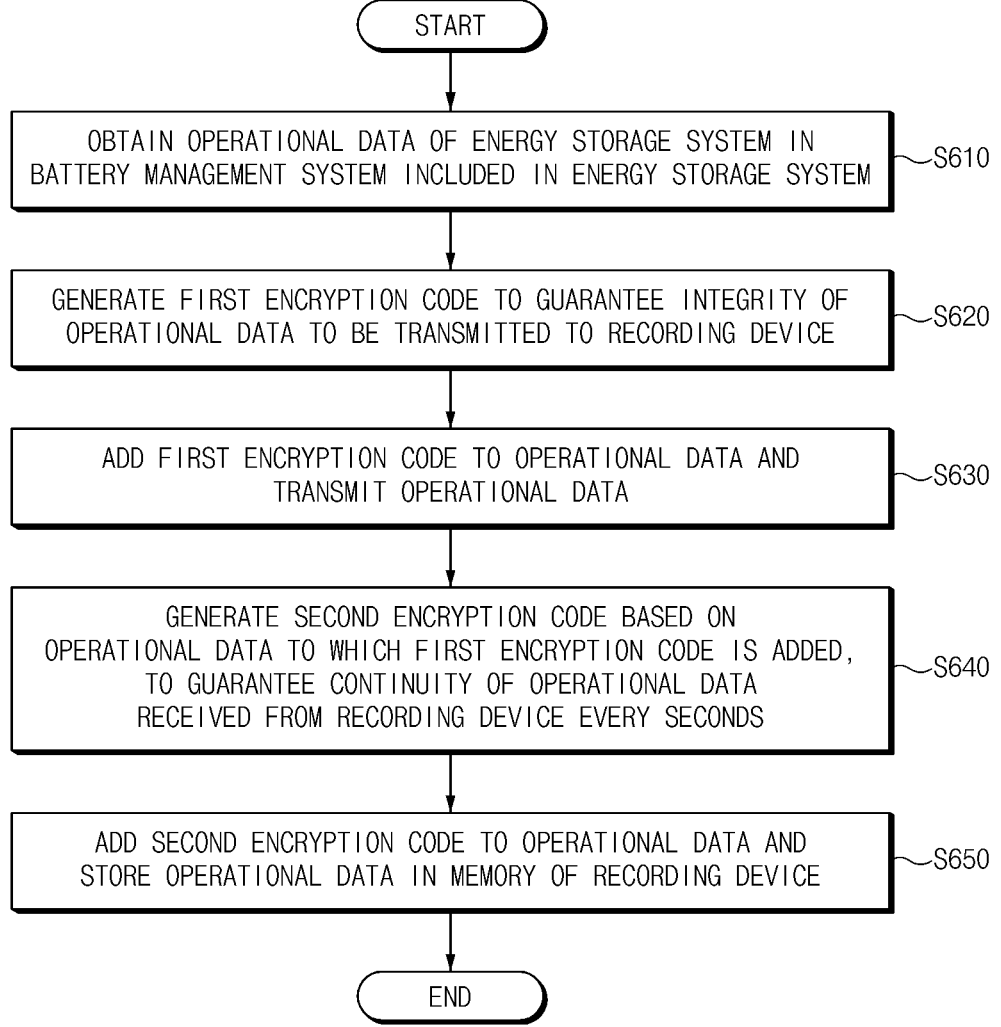
FIG. 6 is a flowchart showing am operating method of an ESS according to another embodiment.

FIG. 6 is a flowchart showing am operating method of an ESS according to another embodiment. Operations S610 to S630 of FIG. 6 performed by the battery management system 110 may be the same as operations S410 to S430 of FIG. 4, and thus a redundant description thereof will be omitted.

In succession to operations S610 to S630, in operation S610, the controller 121 obtains operational data of the energy storage system in the battery management system included in the power storage system, in operation S620, the controller 121 generates first encryption code to guarantee the integrity of the operational data to be transmitted to the recording device 120, in operation S630, the controller adds the first encryption code to the operational data to transmit the operational data to the recording device 120. Operation S630 may be performed through the communication unit 112 of the battery management system 110. The controller 121 of the recording device 120 may perform operation S640 of generating a second encryption code (also called a "Chain Byte") based on the operational data to which the first encryption code is added, to guarantee continuity of the operational data received every periods. This is intended to prevent a third party from deceiving a usage pattern by arbitrarily mixing the order of the operational data. According to an embodiment, a second encryption code CBn of the operational data received in an nth period may be generated by encrypting the first encryption code CAn and a second encryption code CBn−1 of operational data received in a previous period in a designated manner (e.g., a CRC 16 or CRC 32 encryption manner). Additionally, the controller 121 can perform operation S650 of adding a second encryption code to the operational data and storing the operational data in the memory of the recording device 120.

FIG. 7 shows operational data to which a second encryption code is added, according to an embodiment. Referring to FIG. 7, a first encryption code CA1 may be added to operational data D1 received by the recording device 120 in a first period. A second encryption code CB1 in an initial period may not be generated using data in a previous period, and thus may be preset to a particular value.

A first encryption code CA2 may be added to operational data D2 received in a second period, and the recording device 120 may generate a second encryption code CB2 by encrypting the first encryption code CA2 and the second encryption code CB1 of the operational data D1 in the first period in a designated manner. In the same manner, a second encryption code CB3 of operational data D3 in a third period may be generated based on a first encryption code DA3 and the second encryption code CB2 of the operational data D2 in the previous period (the second period).

As such, the recording device 120 may guarantee continuity of data in a block chain form by adding the second encryption code (chain byte) to the operational data every periods. When the second encryption code is CRC-converted and values are not matched (that is, falsification of the operational data is expected), the manager may be informed of so without storing the operational data in the memory 122.

FIG. 8 is a flowchart showing am operating method of an ESS according to another embodiment. Operations S810 to S850 of FIG. 8 performed by the battery management system 110 and the recording device 120 may be the same as operations S610 to S650 of FIG. 6. In operation S810, the controller 121 obtains operational data of the energy storage system in the battery management system included in the power storage system, in operation S820, the controller 121 generates first encryption code to guarantee the integrity of the operational data to be transmitted to the recording device 120, in operation S830, the controller adds the first encryption code to the operational data to transmit the operational data to the recording device 120. Operation S830 may be performed through the communication unit 112 of the battery management system 110. The controller 121 of the recording device 120 may perform operation S840 of generating a second encryption code based on the operational data to which the first encryption code is added, to guarantee continuity of the operational data received every period. Additionally, the controller 121 can perform operation S850 of adding a second encryption code to the operational data and storing the operational data in the memory of the recording device 120.

In succession to operations S810 to S850, the recording device 150 may perform operation S860 of determining whether operational data stored in the recording device 120 is branched, and perform operation S870 of generating a third encryption code based on a second encryption code added to operational data in a period immediately before branching when data branching occurs (yes in operation S860).

The third encryption code (also called a "Device Byte") may be a code for identifying a series of operational data before branching and preventing the series of the operational data from being falsified after branching. For example, to prevent the third party from deceiving a usage pattern by recycling the entire data of other recording devices, an encryption code may be added to an operational data set before branching.

According to an embodiment, the third encryption code of the operational data may be generated based on the second encryption code added to the operational data in a period immediately before branching, an identification number (serial number) of the recording medium 120, and information Unixtime of a time in which the series of the operational data begins to be stored in the memory 122 of the recording device 120. The third encryption code may be generated by encrypting the information in a designated manner (e.g., CRC 16 or CRC 32).

Figure 9:
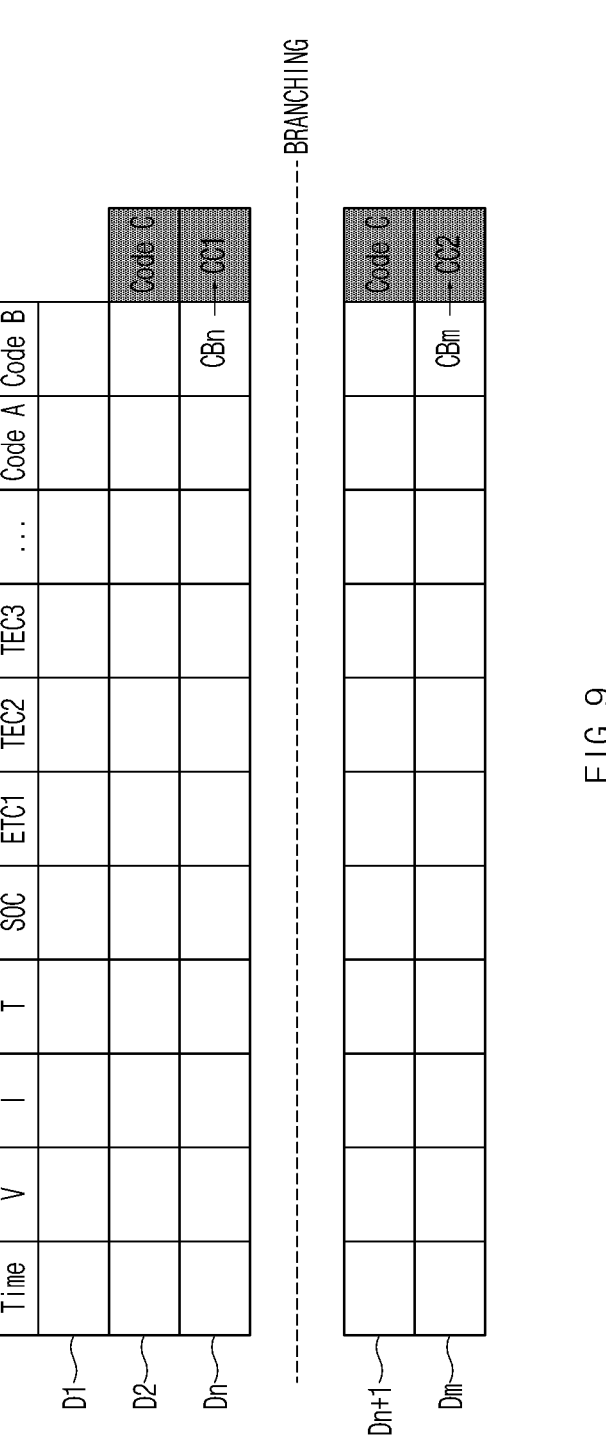
FIG. 9 shows operational data to which a third encryption code is added, according to an embodiment.

FIG. 9 shows operational data to which a third encryption code is added, according to an embodiment. Referring to FIG. 9, the recording device 120 may receive and store operational data D1, D2, . . . , Dn from the first period to the nth period, and the first encryption code and the second encryption code may be added to each operational data. When branching occurs after the operational data Dn is stored up to the nth period (first branching occurs), the recording device 120 may generate a third encryption code CC1 corresponding to first branching by using a second encryption code CBn of the operational data Dn and add the same to the last operational data Dn immediately before branching. The third encryption code may be generated by encrypting the second encryption code CBn, the identification number of the recording device 120 that currently performs recording, and storage start time information (i.e., a time in which D1 is stored).

After first branching, the recording device 120 may receive operational data Dn+1, Dn+2, . . . , Dm corresponding to an (n+1)th period, an (n+2)th period, . . . , an m period. When another branching occurs after the mth period (second branching occurs), the recording device 120 may generate a third encryption code CC2 corresponding to second branching by using a second encryption code CBm of the operational data Dm and add the same to the last operational data Dm immediately before branching. The third encryption code may be generated by encrypting the second encryption code CBm, the identification number of the recording device 120 that currently performs recording, and storage start time information (i.e., a time in which Dn+1 is stored).

Referring back to FIG. 8, when data branching does not occur (no in operation S860), the operating method returns to operation S810 to repeat a process of obtaining operational data in a next period and storing the same in the recording device 120.

The operating method of the ESS according to the embodiment may be Second implemented in the form of an application or a program instruction that is executable through various computer components and recorded in a computer-readable recording medium. The computer-readable recording medium may include a program instruction, a data file, a data structure and the like solely or in a combined manner.

According to the above-described operating method, it is possible to prevent data from being arbitrarily falsified by a third party by encrypting operational data of an energy storage system. In case of a conventional ESS, data is easily falsified at random due to the insufficient protection level of operational data, and when the entire data is encrypted and stored to prevent falsification, excessively much computing resources are consumed. According to an embodiment provided herein, by adding an encryption code generated using a pattern of some data instead of encrypting the entire operational data, it is possible to efficiently prevent a manipulative act of intercepting operational data received from a recording device for each period, cheating a pattern by mixing the order of data for each period, or cheating a usage pattern by using the entire data branched from another recording device.

So far, all components constituting the embodiment have been described as being combined or operating in combination, but it is not necessarily limited to this embodiment, and within the scope of the purpose, all components may be selectively combined with one or more to operate. More-over, terms such as "include", "constitute", "have", etc., described above may mean that the corresponding component may be inherent unless otherwise stated, and thus should be construed as further including other components rather than excluding other components.

The above description is merely illustrative of the technical idea of the present disclosure, and various modifications and variations will be possible without departing from the essential characteristics of embodiments of the present disclosure by those of ordinary skill in the art to which the embodiments disclosed herein pertains. Therefore, the embodiments disclosed herein are intended for description rather than limitation of the technical spirit of the embodiments disclosed herein and the scope of the technical spirit of the present disclosure is not limited by these embodiments disclosed herein. The protection scope of the technical spirit disclosed herein should be interpreted by the following claims, and all technical spirits within the same range should be understood to be included in the range of the present disclosure.

The invention claimed is:

1. A battery management system (BMS) comprising:
a BMS controller including a hardware processor, the BMS controller being configured to:
obtain operational data of an energy storage system (ESS) comprising necessary data related to a state of a battery and additional data;

obtain sampling data by randomly sampling the additional data; and
generate a first encryption code based on the necessary data and the sampling data; and
a communication unit configured to transmit the operational data to which the first encryption code is added, to a recording device,
wherein the first encryption code comprises:
first data indicating an index of the sampling data; and
second data generated by encrypting the necessary data and the sampling data, wherein the recording device comprises:
a recording device controller configured to generate a second encryption code based on the operational data to which the first encryption code is added and add the second encryption code to the operational data; and
a memory configured to store the operational data including the second encryption code, and
wherein the second data and the second encryption code are generated using a cyclic redundancy check (CRC) encryption method.

2. An energy storage system (ESS) comprising:
a battery management system (BMS) controller including a hardware processor, the BMS controller being configured to:
obtain operational data of the ESS comprising necessary data related to a state of a battery and additional data;
obtain sampling data by randomly sampling the additional data; and
generate a first encryption code based on the necessary data and the sampling data;
a communication unit configured to transmit the operational data to which the first encryption code is added to a recording device; and
the recording device configured to receive the operational data to which the first encryption code is added, from the BMS, the recording device comprising:
a recording device controller configured to generate a second encryption code based on the operational data to which the first encryption code is added and add the second encryption code to the operational data; and
a memory configured to store the operational data including the second encryption code,
wherein the first encryption code comprises:
first data indicating an index of the sampling data; and
second data generated by encrypting the necessary data and the sampling data, and
wherein the second data and the second encryption code are generated using a cyclic redundancy check (CRC) encryption method.

3. The ESS of claim 2, wherein the second encryption code is generated based on a first encryption code of operational data received in a current period and a second encryption code of operational data received in a previous period.

4. The ESS of claim 2, wherein the recording device is further configured to generate a third encryption code based on the second encryption code added to the operational data in a period immediately before branching, in response to the operational data stored in the recording device being branched.

5. The ESS of claim 4, wherein the third encryption code is generated based on the second encryption code added to the operational data in the period immediately before branching, an identification number of the recording device, and information of a time in which the operational data begins to be stored in the recording device.

6. The ESS of claim 5, wherein the third encryption code is generated using the cyclic redundancy check (CRC) encryption method.

7. The ESS of claim 2, wherein the necessary data comprises at least one of current time information, a voltage of the battery, a current of the battery, a temperature of the battery, and a state of charge (SoC) of the battery, and wherein the additional data comprises at least one of network configuration information, Internet protocol (IP) information, and a setting value of the battery management system.

8. An operating method of an energy storage system (ESS), the operating method comprising:

obtaining, by a battery management system (BMS) controller, operational data of the ESS comprising necessary data related to a state of a battery and additional data;

obtaining sampling data by randomly sampling the additional data and generating a first encryption code based on the necessary data and the sampling data, by the BMS controller;

adding the first encryption code to the operational data and transmitting the operational data to a recording device, by the BMS controller;

generating a second encryption code based on the operational data to which the first encryption code is added;

adding the second encryption code to the operational data; and storing the operational data including the second encryption code, wherein the first encryption code comprises first data indicating an index of the sampling data and second data generated by encrypting the necessary data and the sampling data, and

wherein the second data and the second encryption code are generated using a cyclic redundancy check (CRC) encryption method.

9. The operating method of claim 8, wherein the second encryption code is generated based on a first encryption code of operational data received in a current period and a second encryption code of operational data received in a previous period.

10. The operating method of claim 8, further comprising generating a third encryption code based on the second encryption code added to the operational data in a period immediately before branching, in response to the operational data stored in the recording device being branched.

11. The operating method of claim 10, wherein the third encryption code is generated based on the second encryption code added to the operational data in the period immediately before branching, an identification number of the recording device, and information of a time in which the operational data begins to be stored in a memory of the recording device.

12. The operating method of claim 11, wherein the second data, the second encryption code, and the third encryption code are generated using a CRC 16 or CRC 32 encryption method.

13. The operating method of claim 8, wherein the necessary data comprises at least one of current time information, a voltage of the battery, a current of the battery, a temperature of the battery, and a state of charge (SoC) of the battery, and wherein the additional data comprises at least one of network configuration information, Internet protocol (IP) information, and a setting value of the battery management system.

* * * * *